US012595996B2

(12) United States Patent
Kikuchi et al.

(10) Patent No.: US 12,595,996 B2
(45) Date of Patent: Apr. 7, 2026

(54) SMALL-SIZED MEASURING DEVICE AND OPERATING METHOD OF THE SAME

(71) Applicant: MITUTOYO CORPORATION, Kawasaki (JP)

(72) Inventors: Mao Kikuchi, Gifu (JP); Tomoharu Kurata, Gifu (JP)

(73) Assignee: MITUTOYO CORPORATION, Kawasaki (JP)

( * ) Notice: Subject to any disclaimer, the term of this patent is extended or adjusted under 35 U.S.C. 154(b) by 387 days.

(21) Appl. No.: 18/488,214

(22) Filed: Oct. 17, 2023

(65) Prior Publication Data

US 2024/0133667 A1     Apr. 25, 2024
US 2024/0230305 A9     Jul. 11, 2024

(30) Foreign Application Priority Data

Oct. 19, 2022     (JP) ................................. 2022-167992

(51) Int. Cl.
    *G01B 3/22*          (2006.01)
(52) U.S. Cl.
    CPC ...................................... *G01B 3/22* (2013.01)
(58) Field of Classification Search
    CPC ........................................................ G01B 3/22
    USPC .................................. 33/501, 542, 832, 833
    See application file for complete search history.

(56) References Cited

U.S. PATENT DOCUMENTS 4,495,701 A  *  1/1985  Nakadoi ................... G01B 3/18
                                                   33/819
4,577,285 A  *  3/1986  Bailey ....................... G01B 3/30
                                                   73/1.81
5,421,101 A  *  6/1995  Rank ......................... G01B 3/22
                                                   33/813
5,969,718 A  *  10/1999  Mills ..................... G06F 3/0238
                                                   715/827
5,979,069 A  *  11/1999  Hayashida ........... G01D 5/2415
                                                   33/832
6,971,182 B1 *  12/2005  Guffey ..................... G01B 3/22
                                                   33/833
6,992,481 B2 *  1/2006  Stotz ..................... G04C 3/146
                                                   324/207.25
7,100,298 B2 *  9/2006  Kiwada .................... G01B 3/22
                                                   33/613

(Continued)

FOREIGN PATENT DOCUMENTS

JP          5192144 B2     5/2013
JP          6472309 B2     2/2019

*Primary Examiner* — George B Bennett
(74) *Attorney, Agent, or Firm* — Oblon, McClelland, Maier & Neustadt, L.L.P.

(57)          ABSTRACT

A small-sized measuring device includes a position detector that is provided on a main body and detects the position of an object to be measured, a timer that measures time, and a central control unit that controls overall operation. The central control unit accepts a base-point setting standby time set by a user and stores the base-point setting standby time. The central control unit measures elapse of the base-point setting standby time after accepting an instruction to start measuring time from the user, performs a base-point setting step of setting the position of the object to be measured detected by the position detector as a base point after the base-point setting standby time has elapsed, and then measures the position of the object to be measured as a relative position from the base point.

8 Claims, 10 Drawing Sheets

(56)                    References Cited

U.S. PATENT DOCUMENTS

| | | | |
|---|---|---|---|
| 8,720,076 B2* | 5/2014 | Zhang | G01B 21/24 |
| | | | 33/832 |
| 9,103,645 B2* | 8/2015 | Hayashi | G01B 21/047 |
| 9,798,445 B2* | 10/2017 | Niwano | G06F 3/0482 |
| 11,892,362 B2* | 2/2024 | Ichikawa | G01B 3/22 |
| 12,480,754 B2* | 11/2025 | Park | G01B 3/22 |
| 2018/0031398 A1* | 2/2018 | Niwano | G06F 3/042 |
| 2019/0162516 A1* | 5/2019 | Abe | G01B 3/22 |
| 2022/0341733 A1* | 10/2022 | Terautchi | G06F 3/03545 |
| 2024/0133666 A1* | 4/2024 | Kikuchi | G06F 3/017 |
| 2024/0142214 A1* | 5/2024 | Makino | G01B 5/28 |

* cited by examiner (USER)

ST111

INSTALL MEASURING DEVICE ON STAND

ST112

INSTALL WORKPIECE

ST113

SET STANDBY TIME
AND NUMBER OF REPETITIONS

A

ST114

TIMER START INSTRUCTION

B

ST115

MAKE FINAL ADJUSTMENT
TO MEASURING DEVICE AND WORKPIECE

ST116

CLOSELY OBSERVE
DISPLAYED VALUE OF INDICATOR (MEASURING DEVICE)

(SECOND EXEMPLARY EMBODIMENT)

（USER）

(MEASURING DEVICE)

SMALL-SIZED MEASURING DEVICE AND OPERATING METHOD OF THE SAME

INCORPORATION BY REFERENCE

This application is based upon and Claim the benefit of priority from JP patent application No. 2022-167992, filed on Oct. 19, 2023 (DAS code E2EA), the disclosure of which is incorporated herein in its entirety by reference.

BACKGROUND OF THE INVENTION

1. Field of the Invention

The present invention relates to a small-sized measuring device and an operating method of the same.

2. Description of Related Art

Calipers, micrometers, dial gauges (indicators), lever-type dial gauges (test indicators), height gauges, and the like are widely used as small measuring devices (small tools) to measure the dimensions and the like of objects to be measured.

Patent Literature 1: JP Patent No. 6472309
Patent Literature 2: JP Patent No. 5192144

SUMMARY OF THE INVENTION

In the cases of using a dial gauge or a lever-type dial gauge, the base point (origin) is often set while its contact point is in contact with a workpiece, a master workpiece, or a gauge block. At this time, a user sets and captures the base point (origin) by operating buttons. However, when the user pushes a button, that is, a measuring device, the position and posture of the measuring device are moved. Then, the base point (origin) is shifted and the postures of the measuring device and the workpiece (or gauge), which have been adjusted to the correct postures, are also shifted, resulting in errors in subsequent measurements.

A purpose of the present invention is to provide a measuring device capable of improving measurement accuracy by eliminating position and posture shifts caused by user operations for a base point (origin) setting instruction and a measurement start instruction.

A small-sized measuring device according to an exemplary embodiment of the present invention includes:

a main body;

a position detector provided on the main body and configured to detect a position of an object to be measured by contact or non-contact;

a timer configured to measure time; and a central control unit configured to control overall operation, wherein the central control unit is configured:

to accept a base-point setting standby time set by a user and store the base-point setting standby time;

to measure elapse of the base-point setting standby time after accepting an instruction to start measuring time from the user;

to perform a base-point setting step of setting the position of the object to be measured detected by the position detector as a base point after the base-point setting standby time has elapsed; and to perform a measurement step of measuring the position of the object to be measured as a relative position from the base point.

In an exemplary embodiment of the present invention, it is preferable that the central control unit is configured to repeat the base-point setting step at intervals of the base-point setting standby time while performing the measurement step.

In an exemplary embodiment of the present invention, it is preferable that the central control unit is further configured:

to accept a base-point resetting standby time set by the user and store the base-point resetting standby time; and to repeat the base-point setting step at intervals of the base-point resetting standby time while performing the measurement step.

In an exemplary embodiment of the present invention, it is preferable that the position detector is a detector having a single measurement axis.

In an exemplary embodiment of the present invention, it is preferable that the position detector includes:

a movable member provided on the main body to be movable forward and backward and to be brought into contact with the object to be measured; and an encoder configured to detect a position of the movable member.

In an exemplary embodiment of the present invention, it is preferable that the small-sized measuring device is a portable small-sized measuring device to be carried in a hand of the user and to be attached to a stand to maintain a relative posture or a relative position with respect to the object to be measured.

In an exemplary embodiment of the present invention, it is preferable that the main body is provided with an input device with which the user gives the instruction to start measuring time.

An operating method of a small-sized measuring device according to an exemplary embodiment of the present invention, the method includes:

completing by a user, after an instruction to start measuring time, adjustment of a relative position or a relative posture between an object to be measured and the small-sized measuring device before the base-point setting standby time elapses.

A small-sized measuring device according to an exemplary embodiment of the present invention includes:

a main body;

a position detector provided on the main body and configured to detect a position of an object to be measured by contact or non-contact;

a non-contact input sensor configured to sense an instruction of a user in a non-contact manner; and a central control unit configured to control overall operation, wherein the non-contact input sensor is configured to function at least as an input device configured to accept a base-point setting instruction from the user, and the central control unit is configured:

to perform, when accepting the base-point setting instruction from the user through the non-contact input sensor, a base-point setting step of setting the position of the object to be measured detected by the position detector as a base point; and to perform a measurement step of measuring the position of the object to be measured as a relative position from the base point.

In an exemplary embodiment of the present invention, it is preferable that the non-contact input sensor is a photosensor.

In an exemplary embodiment of the present invention, it is preferable that the non-contact input sensor is a human detecting sensor.

In an exemplary embodiment of the present invention, it is preferable that the non-contact input sensor is a non-contact touch panel.

In an exemplary embodiment of the present invention, it is preferable that the small-sized measuring device further includes a timer configured to measure time, wherein the central control unit is configured:

to measure a duration time of operation performed by the user through the non-contact input sensor; and to perform predetermined mode switching according to the duration time of operation.

In an exemplary embodiment of the present invention, it is preferable that the central control unit is configured:

to store types of input instructions acceptable through the non-contact input sensor while performing the measurement step;

to accept an input instruction from the user through the non-contact input sensor while performing the measurement step; and to perform mode switching according to the input instruction.

In an exemplary embodiment of the present invention, it is preferable that the position detector is a detector having a single measurement axis.

In an exemplary embodiment of the present invention, it is preferable that the position detector includes:

a movable member provided on the main body to be movable forward and backward and to be brought into contact with the object to be measured; and an encoder configured to detect a position of the movable member.

In an exemplary embodiment of the present invention, it is preferable that the small-sized measuring device is a portable small-sized measuring device to be carried in a hand of the user and to be attached to a stand to maintain a relative posture or a relative position with respect to the object to be measured.

In an exemplary embodiment of the present invention, it is preferable that the small-sized measuring device further includes a timer configured to measure time, wherein the central control unit is further configured:

to accept a base-point resetting standby time set by the user and store the base-point resetting standby time; and to repeat the base-point setting step at intervals of the base-point resetting standby time while performing the measurement step.

In an exemplary embodiment of the present invention, it is preferable that the base-point resetting standby time is input through the non-contact input sensor, and the central control unit is configured to store the base-point resetting standby time input through the non-contact input sensor.

An operating method of a small-sized measuring device according to an exemplary embodiment of the present invention, the method includes:

inputting by a user, after completing adjustment of a relative position or a relative posture between an object to be measured and the small-sized measuring device, a base-point setting instruction through the non-contact input sensor.

DETAILED DESCRIPTION

Figure 1:
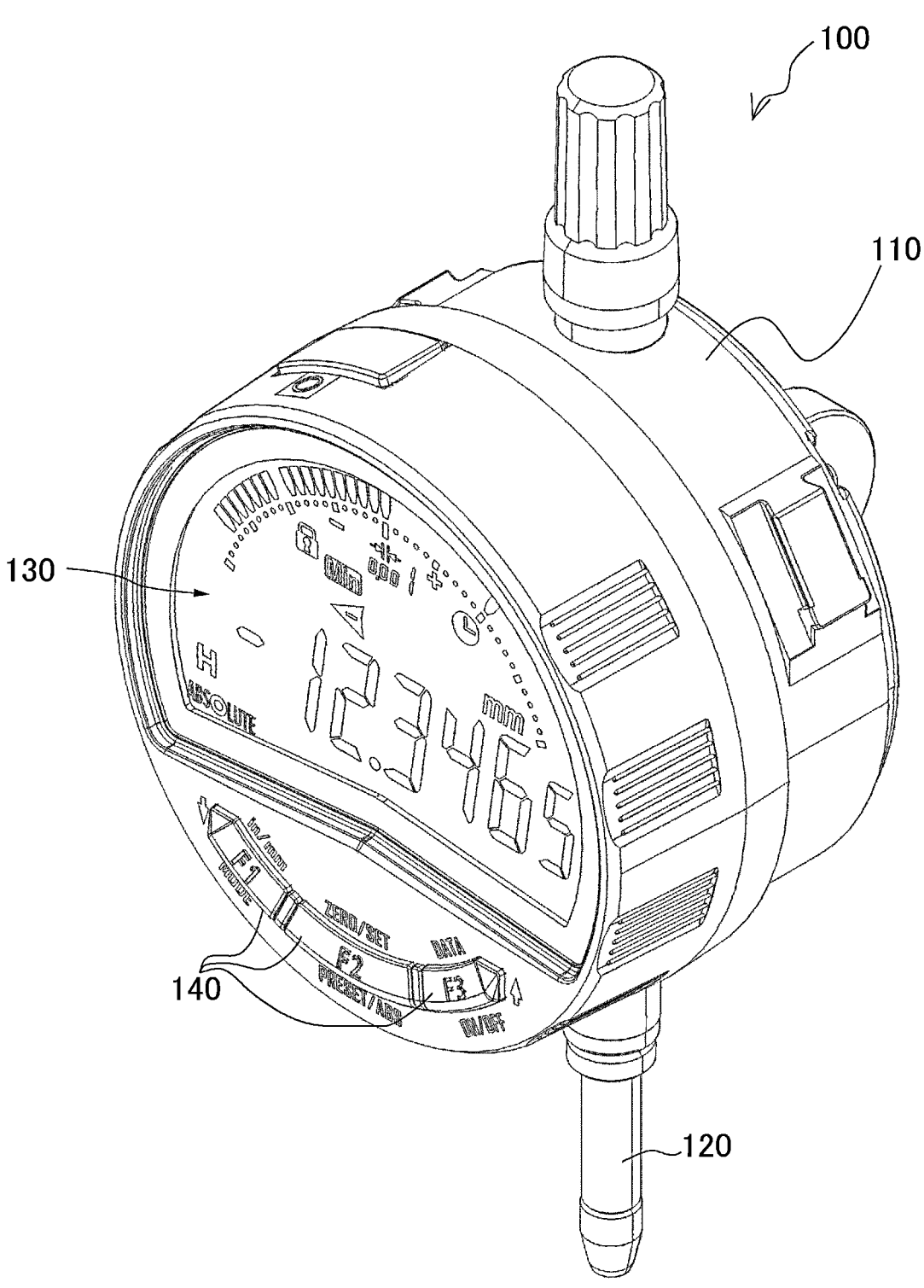
FIG. 1 is an external appearance diagram of an indicator.

Embodiments of the present invention are illustrated and described with reference to the reference signs assigned to the elements in the drawings.

First Exemplary Embodiment

A first exemplary embodiment of the invention is described below.

A small-sized measuring device in the present exemplary embodiment is a portable small-sized measuring device that can be carried in a user's hand and is intended to be used while attached to a stand to maintain a relative posture or a relative position with respect to an object to be measured. The small-sized measuring device is intended to be used for micro-displacement measurements, such as surface textures, contours, dimensions (for example, height and width by comparative length measurement), circular runout, total runout, flatness, parallelism, and the like of the object to be measured and machining errors of machined products relative to a master workpiece (or block gauge). Such measuring devices include, for example, dial gauges and lever-type dial gauges. (This type of measuring device is also called indicator, test indicator, digital indicator, digital test indicator, linear gauge, height gauge, and the like.)

In the present exemplary embodiment, what is called a digital indicator 100 (hereinafter, referred to as an "indicator") is described as an example.

FIG. 1 shows an external appearance diagram of the indicator 100.

The indicator 100 digitally displays the displacement of a spindle 120 on a display part 130.

The indicator 100 includes a measuring device main body 110, a spindle (movable member) 120, a display part 130, a plurality of buttons (input means) 140, and an electric circuit unit 150.

The measuring device main body 110 is a short cylindrical case body.

The spindle 120 includes a contact point at its tip and is supported so as to be movable backward and forward through the measuring device main body 110 in the axis direction. The measuring device main body 110 incorporates an encoder 151 that detects the displacement of the spindle 120. The encoder 151 is a sensor that outputs an electrical signal in response to the displacement (or absolute position) of the object to be measured and is, for example, a linear encoder or a rotary encoder. Detection methods of the encoder include photoelectric, capacitance, electromagnetic induction, and magnetic detection methods.

In the present exemplary embodiment, the spindle 120 and the encoder 151 constitute a position detector that detects the position (or displacement) of the object to be measured.

The display part 130 is disposed in an approximately central area of the front side end face of the measuring device main body 110. The display part 130 is, for example, a liquid crystal display panel. The display part 130 may be a segment or dot matrix liquid crystal display panel, an organic EL panel, or electronic paper.

The display part 130 has a numerical display field and an analog scale display field.

The numerical display field shows numerical values. The meaning of the numerical values shown here depends on the mode selected at the time. For example, in a measurement mode, the numeric value in the numerical display field is a measurement value itself. The measurement value is expressed, for example, as the difference from the base point (origin) set by calibration.

In a hold mode, the measurement value (displayed value) is fixed and displayed. For example, depending on the user setting, the maximum value (Max) or the minimum value (Min) can be displayed on hold. Alternatively, the middle value between the maximum and minimum values (here, referred to as the intermediate value) may be displayed on hold (intermediate-value hold display). Furthermore, the runout range (maximum value-minimum value, Tir) in the runout measurement may be displayed on hold.

Alternatively, when in a tolerance setting mode or a preset mode, the numerical value in the numerical display field indicates the tolerance or preset value entered by the user through the input means (buttons 140).

The analog scale display field shows an arc-shaped scale and several marks that are displayed and controlled in conjunction with the scale. On the arc-shaped scale, marks imitating a pointer meter are displayed to light up, move, or increase/decrease according to the measurement value (displayed value). In addition, a mark indicating the maximum tolerance, which is the upper limit value, and a mark indicating the minimum tolerance, which is the lower limit value, may also be displayed in conjunction with the arc-shaped scale.

Next, the input means is described below.

As the input means, the buttons 140 are provided. The buttons 140 are disposed below the display part 130 on the front side end face of the measuring device main body 110. These buttons 140 are assigned functions such as, for example, a mode switching instruction and a numerical value capturing instruction. In the present exemplary embodiment, the user can input a setting for any length of time by operating the buttons 140.

The term "time" will be described later.

In the present exemplary embodiment, the user can also input an instruction to start measuring time by operating the buttons 140.

Figure 2:
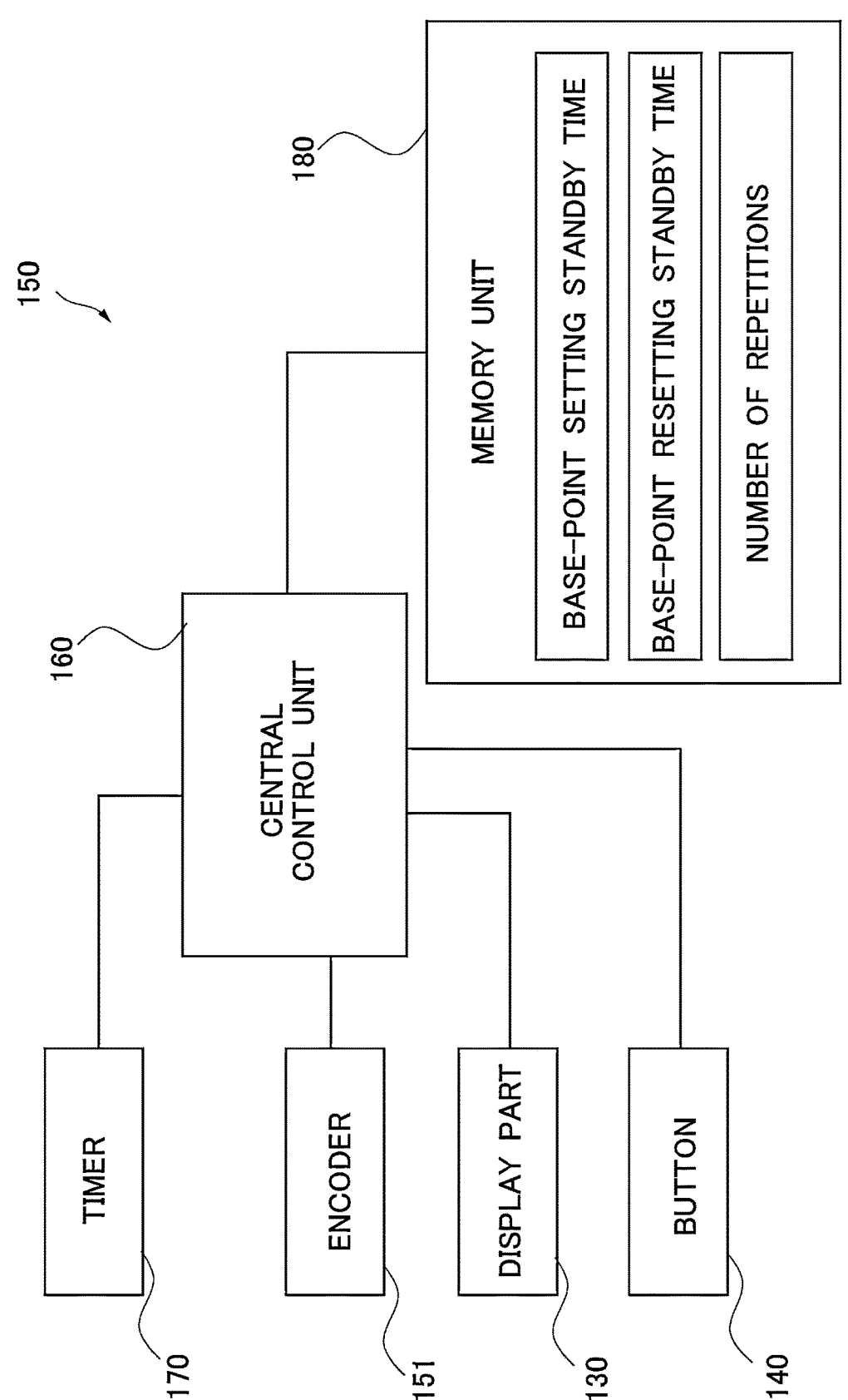
FIG. 2 is a functional block diagram of an electric circuit unit.

FIG. 2 shows a functional block diagram of the electric circuit unit 150.

The electric circuit unit 150 includes a central control unit 160 that controls the overall operation, a timer 170 that measures time, and a memory unit 180 that stores various setting values or measurement values.

The central control unit 160 includes a counter that counts the position (or displacement) of the spindle 120 based on a detection signal from the encoder 151. The central control unit 160 displays the value of the counter and the like on the display part 130. The specific functions of the central control unit 160 and its control operations will be described later.

The operating method of the indicator 100 in the present exemplary embodiment is described with reference to the flowcharts in FIGS. 3 and 4.

Figure 3:
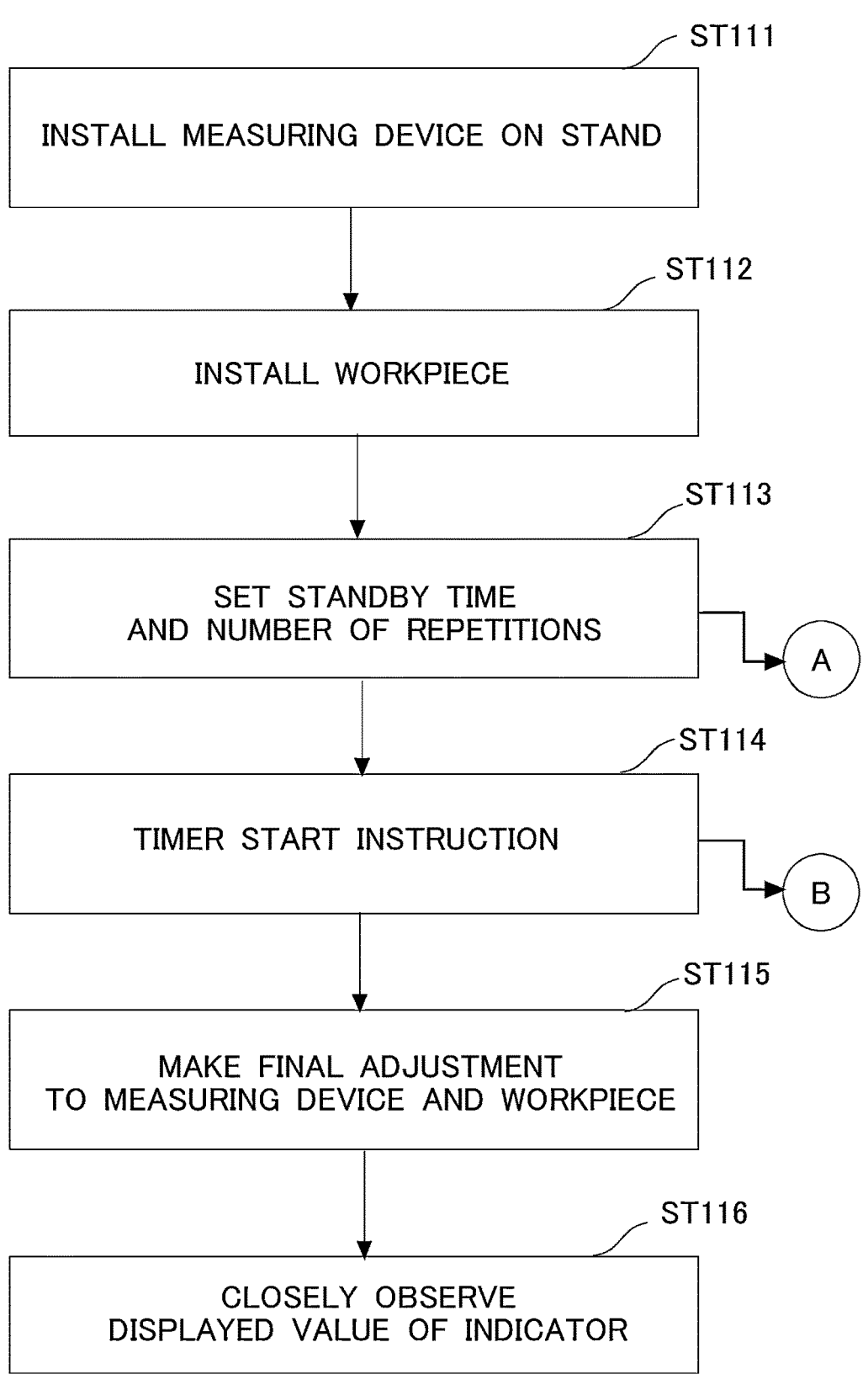
FIG. 3 is a flowchart showing a procedure of user operation in using the indicator.

FIG. 3 is a flowchart showing a procedure of user operation in using the indicator 100.

Figure 4:
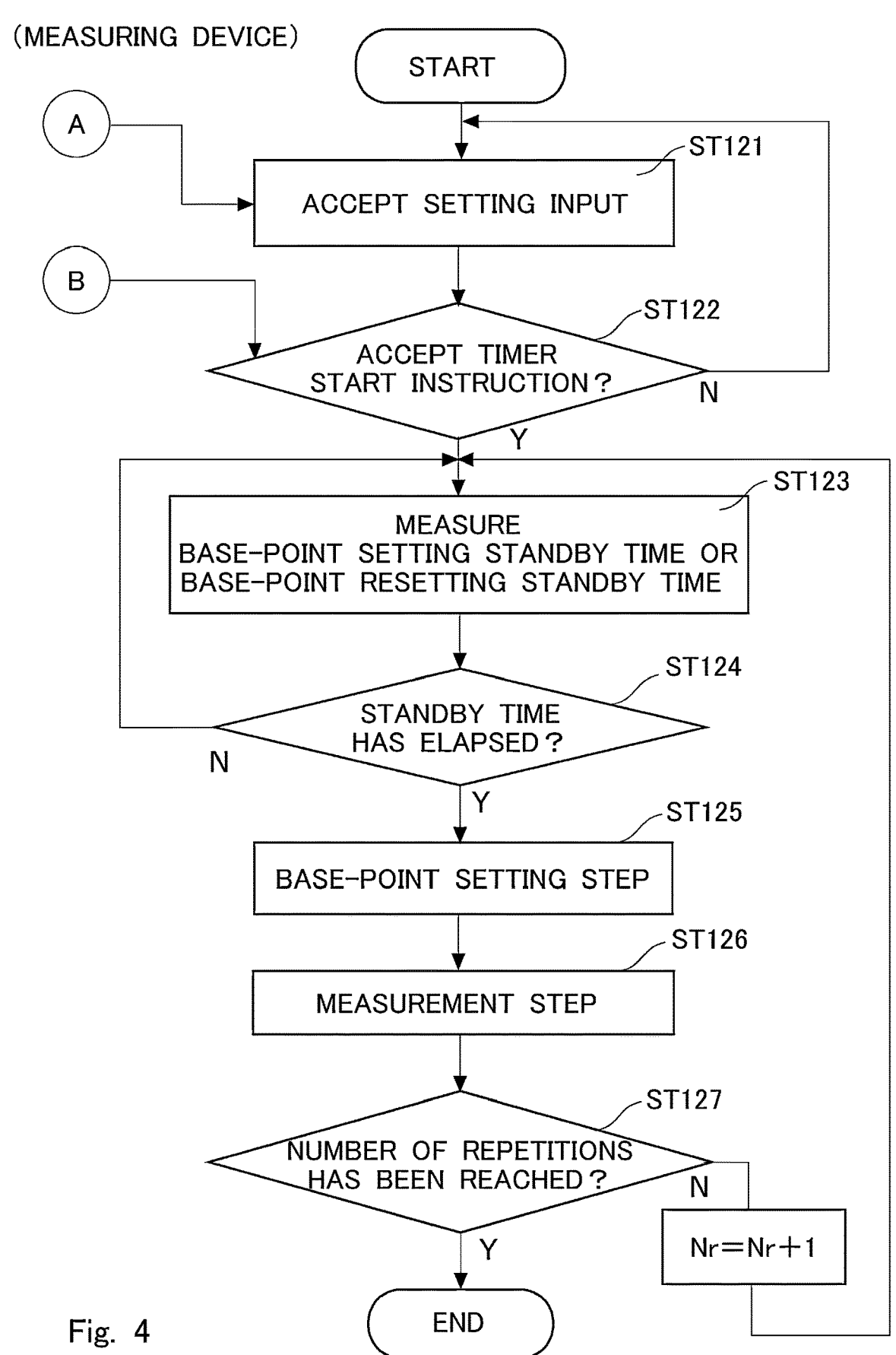
FIG. 4 is a flowchart showing the operation of the indicator.

FIG. 4 is a flowchart showing the operation of the indicator 100 and mainly shows the operation of the central control unit 160.

First, in steps ST111 and ST112, the user installs the indicator 100 and a workpiece (object to be measured) W.

Figure 5:
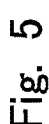
FIG. 5 is a view showing that the indicator is measuring the runout of a workpiece W.

Here, the case of measuring the runout (circular runout or total runout) of a hollow cylindrical (or cylindrical) workpiece W while rotating the workpiece W on a lathe 20 as shown in FIG. 5 is described.

The user attaches the indicator 100 to a stand 10. The user also attaches the workpiece W to the chuck of the lathe 20. At this time, the user ensures that the spindle 120 (the extension of the spindle 120) of the indicator 100 is perpendicular to the rotation axis (extension of the rotation axis) of the lathe 20. If the rotation axis of the lathe 20 is horizontal, the user attaches the indicator 100 to the stand 10 in such a manner that the spindle 120 of the indicator 100 is parallel to a vertical line. Then, the spindle 120 is made to approach the workpiece W from directly above along the vertical line.

At this point, it is desirable that the relative posture between the indicator 100 and the workpiece W is accurately adjusted. However, the relative posture adjustment does not have to be perfect since there is an opportunity for final adjustment after this point.

Next, the user sets the standby time and the number of repetitions for setting the base point by operating the buttons 140 in ST113. Here, it is assumed that two times can be set as the standby time for setting the base point. One is a base-point setting standby time, and the other is a base-point "resetting" standby time. For example, 30 seconds is set as the base-point setting standby time, and 60 seconds is set as the base-point resetting standby time.

The number of repetitions is the number of times the base-point resetting is repeated. The number of repetitions may be paraphrased as the number of measurements. For example, the number of repetitions is set to 10.

In the setting mode, it is desirable that the display part 130 shows the base-point setting standby time, the base-point resetting standby time, and the number of repetitions that have been set and input by the user.

The set and input standby times (the base-point setting standby time and the base-point resetting standby time) and the number of repetitions are accepted by the central control unit 160 of the indicator 100 and stored in the memory unit 180 (ST121 in FIG. 4).

When the necessary setting values have been input, the central control unit 160 enters a standby state (mode) for waiting for an instruction to start measurement. After this, the operation (signal) for a timer start instruction (ST114) from the user is the instruction to start measurement. When accepting the operation (signal) for a timer start, the central control unit 160 waits for the set standby time to elapse, then sets the base point (origin), and further automatically transitions to a mode for performing the measurement operation.

In the setting operation (ST113), the user is supposed to push the buttons 140 on the measuring device main body 110 of the indicator 100, which slightly shifts the previously set position and posture of the indicator 100. Therefore, it is desirable to accurately adjust the relative posture between the indicator 100 and the workpiece W again at this point. However, since there is an opportunity for final adjustment after this point, the relative posture adjustment does not have to be perfect.

When the various setting inputs have been completed, the user instructs the timer 170 to start measuring time by operating the buttons 140 in ST114. Then, the final adjustment of the relative posture between the indicator 100 and the workpiece W is made (ST115). After this, the user should not directly touch the indicator 100 and the workpiece W. Although the user may push the rotation switch of the lathe 20 or manually rotate the lathe 20 if necessary, the user should not directly touch the indicator (measuring device) 100 and the workpiece W with their hand. Then, the user only needs to closely observe the displayed value of the indicator 100 (ST116).

Now, in ST122 in FIG. 4, when the indicator 100 accepts the timer start instruction (ST114 in FIG. 3) from the user (ST122: YES), the indicator 100 starts measuring time (timekeeping) with the timer 170 (ST123) and waits for the set base-point setting standby time (30 seconds) to elapse (ST124). During this base-point setting standby time (30 seconds), the user makes the final adjustment to the indicator 100 and the workpiece W as described above (ST115).

When the base-point setting standby time has elapsed (ST124: YES), the central control unit 160 sets the base point (origin) at that point (base-point setting step: ST125). In other words, the counter value of the encoder 151 is reset to zero at this point. (Alternatively, an offset calibration may be performed in order for the measurement value at this point to be zero.) The display part 130 displays zero at this instant.

After the base-point setting step (ST125), the central control unit 160 performs a normal measurement step (ST126). That is, the central control unit 160 acquires the measurement value and displays it on the display part 130. In the present exemplary embodiment, if there is distortion (deviation from a perfect circle) in the contour of the workpiece W, the amount of distortion is displayed on the display part 130 as the measurement value.

The measurement value is displayed on the display part 130, recorded in the internal memory (memory unit 180) of the measuring device (indicator 100), and transferred to an external data collection device (for example, a dedicated PC or server) via wireless communication or the like.

In parallel with performing the measurement step (ST126), the central control unit 160 measures the base-point resetting standby time (ST123) and repeats the base-point setting step (ST125) at intervals of the base-point resetting standby time. In other words, if the set number of repetitions has not been reached (ST127: NO), the central control unit 160 measures the base-point resetting standby time (60 seconds) with the timer 170 (ST123). (During this base-point resetting standby time (60 seconds), the measurement step (ST126) is performed in parallel.)

When the base-point resetting standby time has elapsed (ST124: YES), the central control unit 160 sets the base point (origin) at that point (ST125). The runout from the newly set base point (origin) is acquired as the measurement value and displayed on the display part 130. This allows the magnitude of runout at regular intervals (every 60 seconds) to be captured.

The steps ST123 to ST127 are repeated until the set number of repetitions (10 times) is reached, and the procedure is terminated when a predetermined number of measurement data has been acquired.

According to this configuration in the present exemplary embodiment, the user does not have to touch the measuring device (indicator 100) during the base point (origin) setting step (ST125) and the measurement step (ST126). After the user pushes the buttons 140 for an instruction to start measuring time (the timer start instruction ST114), the user completes the posture adjustment within a predetermined time (base-point setting standby time). Then, after the standby time elapses, the indicator 100 automatically sets the base point (origin). Therefore, the measurement posture of the measuring device is extremely accurate, and the measurement values do not fluctuate. In addition, when the buttons 140 are pushed (ST114) for the instruction to start measuring time, the lathe 20 is not yet rotating, which reduces the risk of a human body or clothes being caught in the rotating workpiece W. Then, the base point (origin) is automatically reset every predetermined time (base-point resetting standby time). Therefore, there is no need to operate buttons to set the base point (origin) one after another. This improves measurement accuracy, measurement efficiency, and safety.

As a method of remotely performing the base-point setting operation (or the instruction to start the measurement operation) without touching the measuring device, it is conceivable to provide the buttons separately from the measuring device main body 110 using a wired cable, like the release on a camera. However, considering the case of measuring the workpiece W rotating on the lathe 20, it is dangerous to use a wired cable.

It is also conceivable to operate the measuring device with a remote controller capable of wireless communication. However, if a large number of remote controllers are provided for a large number of measuring devices, it is difficult to manage the remote controllers and difficult to know which remote controller corresponds to which measuring device. In addition, remote controllers that are separate from measuring device main bodies are often lost.

Therefore, as in the present exemplary embodiment, a measuring device that is designed in such a manner that the user does not touch the measuring device with their hand during the base-point setting and measurement, while the operation buttons 140 are provided on the measuring device itself, meets the actual user needs and is highly convenient.

In the above embodiment, the base-point setting standby time and the base-point resetting standby time are set to be different but may be set to be the same. In this case, there is no need to distinguish between the base-point setting standby time and the base-point resetting standby time, and a single set time is used.

The buttons 140 can be mechanical pushbuttons or, for example, "buttons" displayed on a pressure-sensitive touch panel.

As the measuring device, the present invention is not limited to small contact-type measuring devices, but can also be applied to, for example, non-contact distance meters (range meters). These include laser distance sensors (laser range meters), capacitive displacement sensors, and focal (confocal and chromatic) distance sensors. Like indicators (dial gauges), they are common in that they are measuring devices (detectors) having a single measurement axis perpendicular to the surface of an object to be measured.

The present invention can be effective for any measuring device in which the setting of the relative posture between a workpiece and the measuring device affects the accuracy of measurement although the measuring axis is not perpendicular to the workpiece.

As small contact-type measuring devices, calipers and micrometers (micrometer heads) may be equipped with the functions of the present invention.

Second Exemplary Embodiment

Next, a second exemplary embodiment of the invention is described below.

A measuring device in the second exemplary embodiment is basically the same as the indicator 100 in the first exemplary embodiment, but a base point (origin) setting instruction (measurement start instruction) is made through a photosensor in the second exemplary embodiment.

Figure 6:
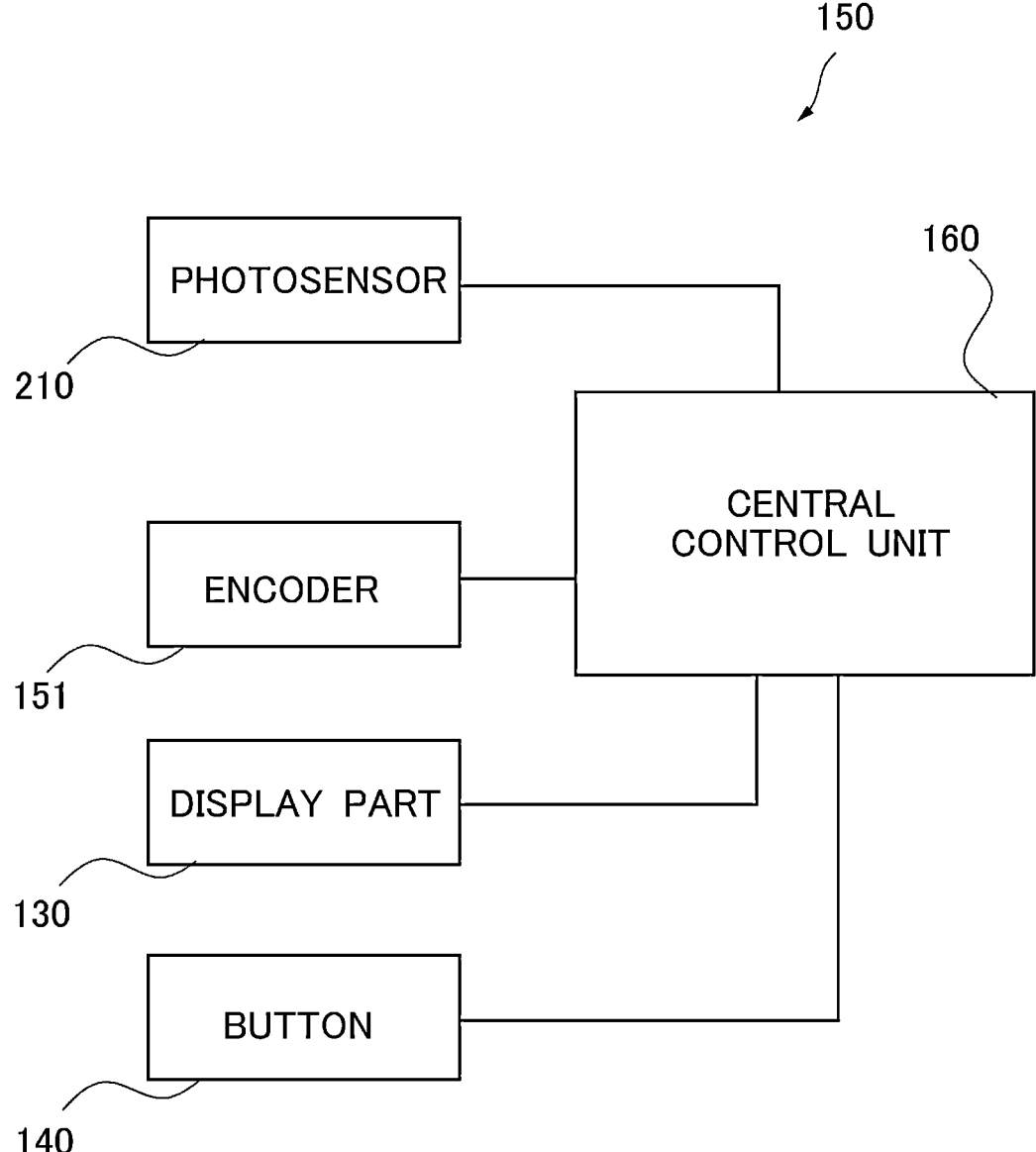
FIG. 6 is a functional block diagram in a second exemplary embodiment.

FIG. 6 is a functional block diagram in the second exemplary embodiment.

Figure 7:
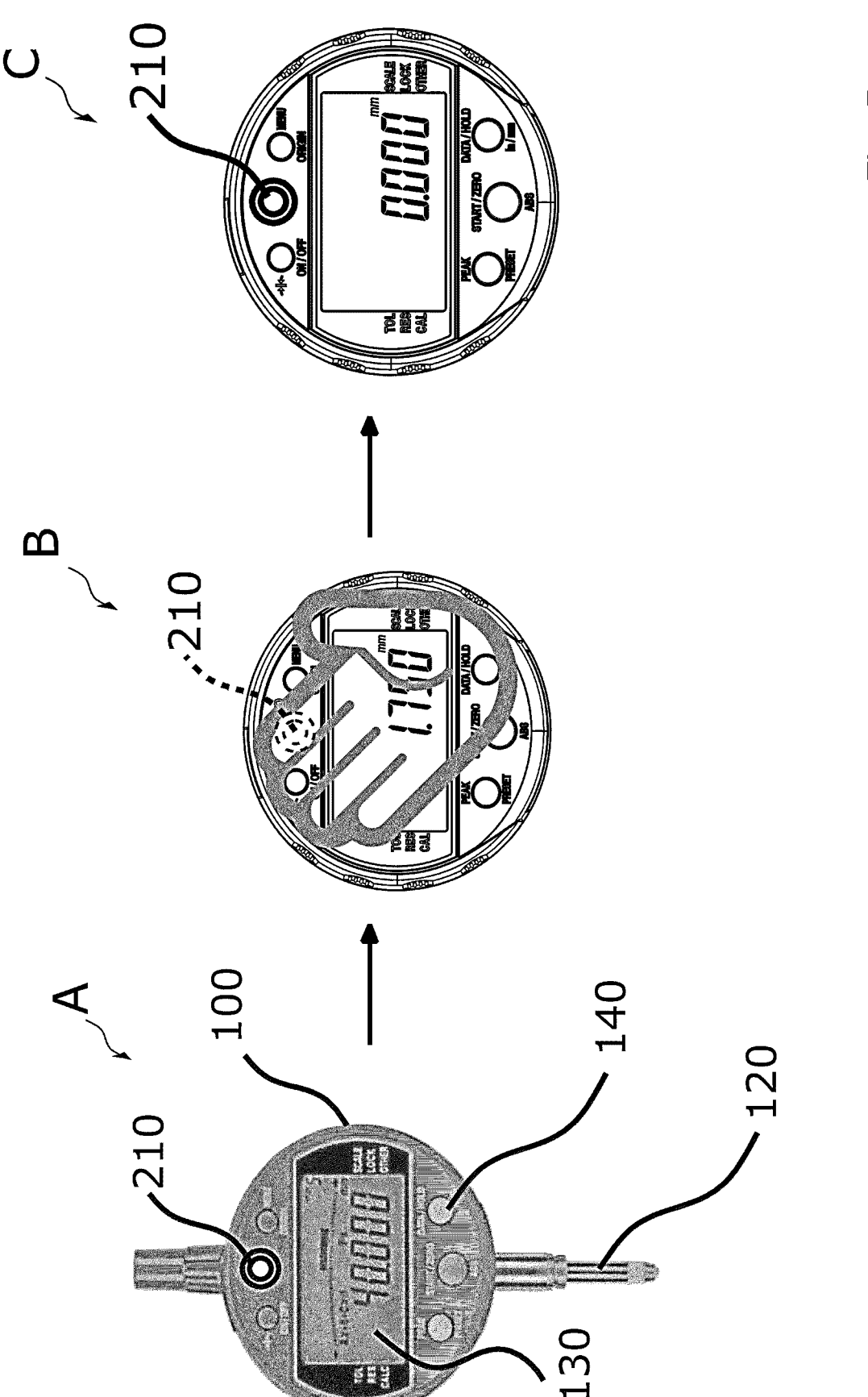
FIG. 7 is a diagram showing examples of the appearance and operation of an indicator in the second exemplary embodiment.

FIG. 7 is a diagram showing examples of the appearance and operation of an indicator 100 in the second exemplary embodiment.

A photosensor 210 (for example, a phototransistor) is provided on the surface of a measuring device main body 110 (FIG. 7).

An electric signal photoelectrically converted by the photosensor 210 is input to a central control unit 160. The central control unit 160 recognizes that a base point (origin) setting instruction from a user has been accepted when the value of the photoelectric signal changes by a predetermined threshold ($\Delta$Ith) or more.

In the present exemplary embodiment, when the user holds their hand or a light-shielding object in front of the photosensor 210 to block the light (FIG. 7) and an amount of change ($\Delta$I) from a previous light intensity (IA) to a current light intensity (IB) is greater than the predetermined threshold ($\Delta$Ith), that is, when the value of the photoelectric signal decreases by the predetermined threshold ($\Delta$Ith), the central control unit 160 recognizes that the base point (origin) setting instruction has been accepted.

The operating method of the indicator 100 in the second exemplary embodiment is described with reference to the flowcharts in FIGS. 8 and 9.

Figure 8:
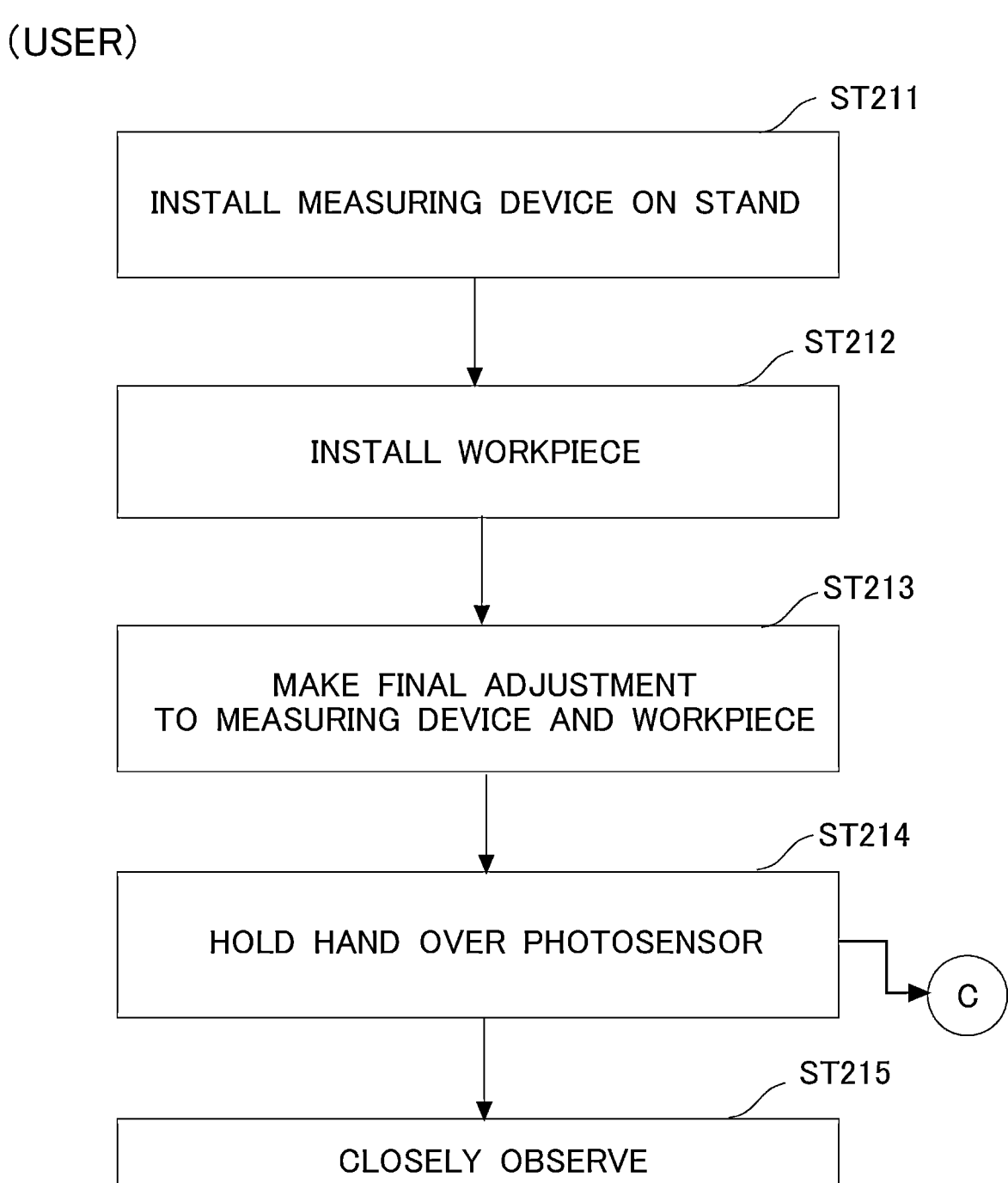
FIG. 8 is a flowchart showing a procedure of user operation in using the indicator in the second exemplary embodiment.

FIG. 8 is a flowchart showing a procedure of user operation in using the indicator 100.

Figure 9:
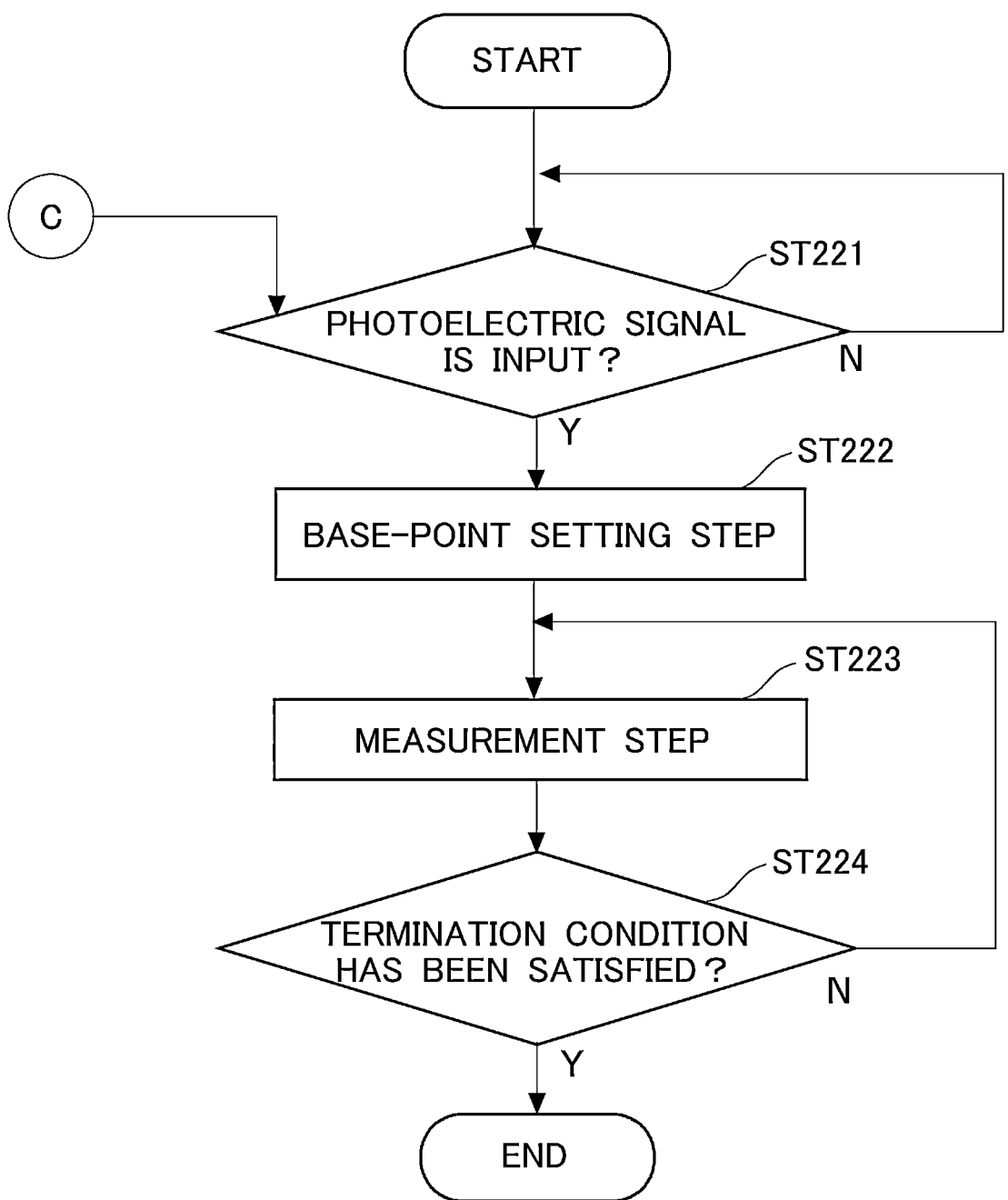
FIG. 9 is a flowchart showing the operation of the indicator in the second exemplary embodiment.

FIG. 9 is a flowchart showing the operation of the indicator 100 and mainly shows the operation of the central control unit 160.

In steps ST211 and ST212, the user installs the indicator 100 and a workpiece W (object to be measured) and then accurately adjusts the relative posture between the indicator 100 and the workpiece W at this point (ST213). If necessary, the user pushes the rotation switch of a lathe 20. The central control unit 160 of the indicator 100 is set to be in a standby state (mode) for waiting for an instruction to start measurement at this point. After this, the operation (signal) from the user through the photosensor 210 is the instruction to set the base point (origin), that is, to start measurement. When accepting the operation through the photosensor 210, the central control unit 160 sets the base point (origin) and automatically transitions to a mode for performing the measurement operation.

The user holds their hand over the photosensor 210 (FIG. 7) to block the light (ST214). This is the instruction to set the base point (origin), that is, to start measurement. Note that "holding the hand over the photosensor 210" does not necessarily mean bringing the hand close to the indicator 100, and it is sufficient to block the light. For example, the photosensor 210 is only required to be placed in the shadow of the hand. Alternatively, instead of a hand, a light-shielding plate or the like is held to block the illumination of electric light.

As shown in FIG. 9, when the operation instruction from the user through the photosensor 210 has been accepted (ST221: YES), the central control unit 160 sets the base point (origin) at that point (ST222). In other words, the counter value of an encoder 151 is reset to zero at this point.

After the base-point setting step (ST222), the central control unit 160 performs a normal measurement step (ST223), that is, acquires the measurement value and displays it on a display part 130. In the present exemplary embodiment, if there is distortion in the contour (circularity) of the workpiece W, the amount of distortion is displayed on the display part 130 as the measurement value.

According to the second exemplary embodiment, the user does not have to directly touch the measuring device (indicator 100) during the base-point setting step (ST222) and the measurement step (ST223). Therefore, measurement accuracy, measurement efficiency, and safety are all improved.

In the present exemplary embodiment, it is assumed that the base point (origin) setting instruction is recognized when the value of a photoelectric signal from the photosensor 210 decreases by a predetermined threshold. Therefore, instead of holding a hand over the photosensor 210, the light of, for example, a flashlight or LED light may be shined on the photosensor 210 and then removed. If the light from the flashlight or LED light is strong, the change in the photoelectric signal from the photosensor 210 can be increased. In this case, the threshold may be increased, which makes it easier to prevent malfunctions (false recognition).

Alternatively, the base point (origin) setting instruction may be recognized when a photoelectric signal is detected to have increased by a predetermined threshold or more by holding a hand (or light-shielding object) over the photosensor 210 to decrease the photoelectric signal and then moving the hand (or light-shielding object) away from the photosensor 210. Since the operation (base-point setting) of the measuring device (indicator) starts after the hand (or light-shielding object) is no longer in front of the measuring device (indicator), the displayed value of the indicator 100 is easier to see and harder to miss.

The predetermined threshold for recognizing an operation instruction from the user through the photosensor 210 may be a fixed reference value (Ir).

The user operation may be recognized when the user holds their hand or a light-shielding object in front of the photosensor 210 to block the light (FIG. 7) and the light intensity decreases below the threshold (reference value (Ir)).

(First Modification)

In the above second exemplary embodiment, the photosensor 210 is used for a base-point setting instruction (measurement start instruction) as an example.

As a modification, the photosensor 210 may further be used as a mode switch.

For example, the first operation (light/dark signal) to the photosensor 210 is recognized as an instruction to automatically switch to the above base point (origin) setting and measurement mode. Then, when the operation mode is in the measurement mode, the operation (light/dark signal) to the photosensor 210 is recognized as an instruction to switch to a maximum-value hold mode. In this case, when, for example, a cylindrical workpiece W is measured while being rotated, the maximum value of the measurement value is displayed on hold. Then, the mode is switched to a minimum value hold mode by the next operation (light/dark signal) to the photosensor 210. In this manner, the user does not need to directly touch the measuring device (indicator) to switch modes. Furthermore, when the photosensor 210 is operated continuously, the display mode may be sequentially shifted as follows: minimum-value hold display→intermediate-value hold display→runout-width hold display→real-time measurement-value display→maximum-value hold display.
(Second Modification)

Instructions may be changed by the time during which light is blocked, instead of the number of times a hand is held over the photosensor 210. In this case, the measuring device (indicator) includes, in addition to the photosensor 210, a timer 170 to measure time. For example, when the central control unit 160 detects that the user holds their hand over the photosensor 210 for blocking the light for less than 10 seconds and the photoelectric signal has increased by a predetermined threshold or more after the user moves the hand away, the mode is switched to the normal measurement mode, after the base point (origin) setting. On the other hand, for example, when the central control unit 160 detects that the user holds their hand over the photosensor 210 for blocking the light for 10 seconds or more and the photo-electric signal has increased by a predetermined threshold or more after the user moves the hand away, the mode is switched to the maximum value hold mode, after the base point (origin) setting. The user can select the measurement mode to be switched to after the base point (origin) setting, depending on the length of time the user holds their hand over the photosensor 210, and no additional selection operation is required after the measurement mode. Obviously, there is no need to touch the measuring device (indicator) directly.
(Third Modification)

When the timer 170 that measures time is provided in addition to the photosensor 210 as in the above second modification, the base-point setting step (ST222) may be repeated a predetermined number of times at intervals of the base-point resetting standby time, as described in the first exemplary embodiment.

In addition, it is desirable that the length of the "base-point resetting standby time" is set using the photosensor (non-contact input sensor) 210. For example, it is assumed that a base point (origin) setting instruction is accepted when a photoelectric signal increases by a predetermined threshold or more by holding a hand (or light-shielding object) over the photosensor 210 to decrease the photoelectric signal and then moving the hand (or light-shielding object) away from the photosensor 210, as the operation for the base point (origin) setting instruction. Here, the time from the point when the photoelectric signal decreases by holding the hand (or light-shielding object) over the photosensor 210 to the point when the photoelectric signal next increases by the predetermined threshold or more is measured, and this time is used as the "base-point resetting standby time". (The time that a non-contact input sensor detects that there is a continuation of the input state by detecting a person, hand, or shielding object is stored in the central control unit as the "base-point resetting standby time.") If the user desires to set a shorter "base-point resetting standby time" (that is, an interval to repeat the base-point setting), the user gives a base point (origin) setting instruction (that is, measurement start instruction) by shielding the photo sensor with their hand for a short time and then immediately moving the hand away from the photosensor. If the user desires to set a longer "base-point resetting standby time", the user gives a base point (origin) setting instruction (that is, measurement start instruction) by shielding the photosensor for a while and then moving the hand away from the photosensor. The user can give a base point (origin) setting instruction (that is, measurement start instruction) as well as a base-point resetting standby time (that is, an interval to repeat the base-point setting) with a simple action (one action) of holding the hand in front of the photosensor.
(Fourth Modification)

Figure 10:
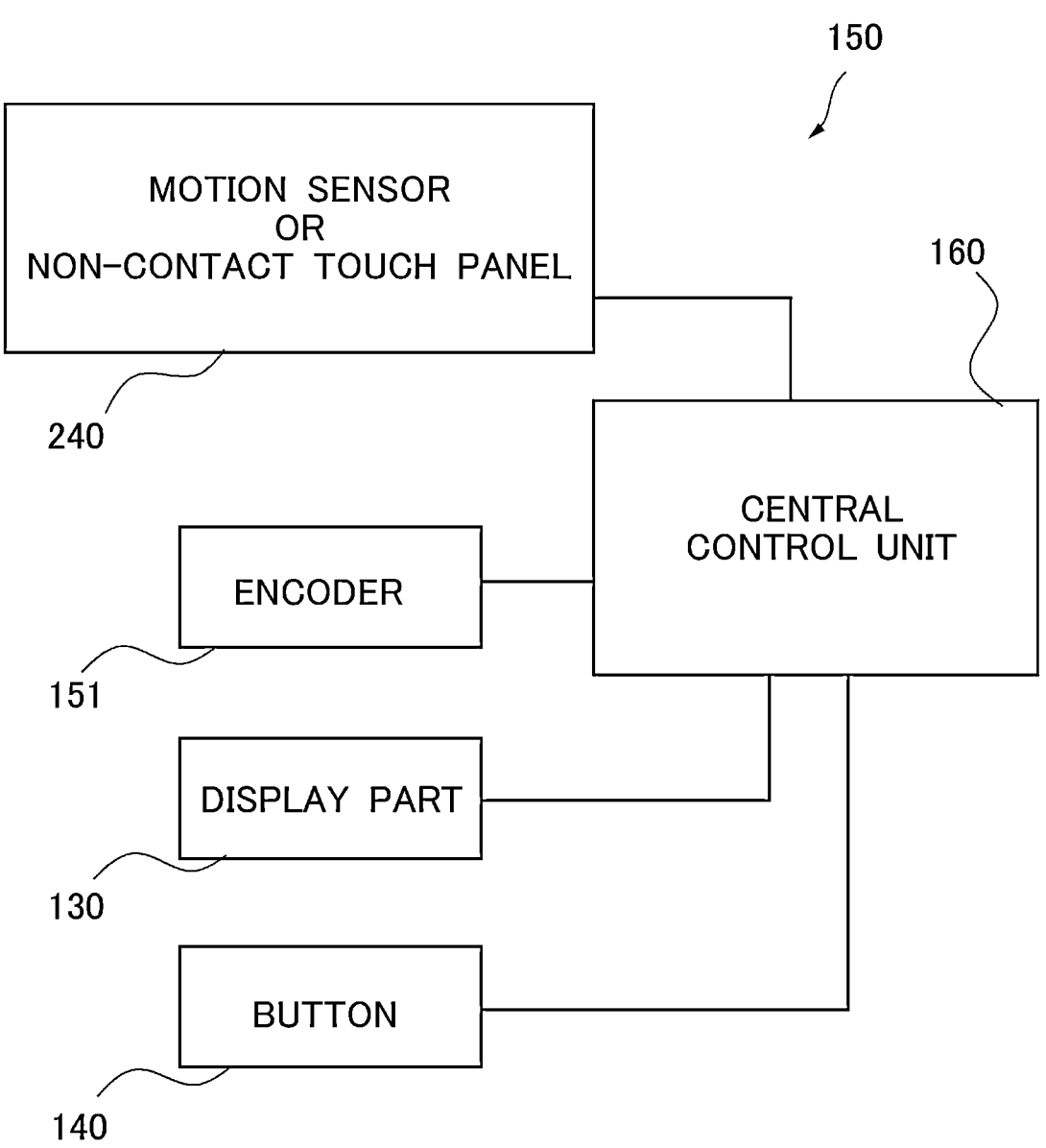
FIG. 10 is a diagram showing a configuration of a modification.

The above second exemplary embodiment describes a case in which the measuring device (indicator) is provided with the photo sensor 210 and an operation instruction is given through the photosensor 210. As a fourth modification, a human detecting sensor 220 may be used (FIG. 10) instead of the photosensor 210. The human detecting sensor 220 is, for example, an infrared or electrostatic sensor. When detecting that the hand of the user has approached the human detecting sensor 220 of the measuring device (indicator), the central control unit 160 recognizes that an operation instruction has been accepted. The control operation can be the same as in the case of the photosensor 210.
(Fifth Modification)

As a fifth modification, a non-contact touch panel 240 may be used instead of the photosensor 210. As the non-contact touch panel 240, a capacitance touch panel with a long detection distance may be used. A hologram type touch panel that makes buttons appear in the air and detects the position of a finger in the air with a laser or other means may also be used. With the non-contact touch panel 240, it is possible to achieve non-contact (touchless) yet somewhat complicated operation instructions through an easy-to-understand graphical user interface (GUI).

The present invention is not limited to the above exemplary embodiments, and can be appropriately modified without departing from the gist.

In the above exemplary embodiments, the runout (circular runout or total runout) of a hollow cylindrical (cylindrical) workpiece W is measured while the workpiece W is rotated, as an example. However, the measuring device according to the present invention can be applied not only to the case of relative displacement (rotation or translation) between the workpiece and the measuring device, but also to the case of simply comparing the dimensional difference between a master workpiece (or block gauge) and the workpiece.

After setting the base point with the master workpiece (or block gauge), the workpiece is measured. Since the user does not directly touch the measuring device when the base point is set, the base-point setting is accurate. When the master workpiece (or block gauge) is changed to a workpiece, the spindle can be lifted, for example, but there is no operation that can shift the setting, such as pushing the measuring device main body (pushing a button).

One measuring device may be provided with two or more timers. The first timer may be used to measure the base-point setting standby time and the second timer may be used to measure the base-point resetting standby time, for example.

One measuring device may be provided with two or more non-contact input sensors.

When a plurality of (two or more) non-contact input sensors is provided, there may be two or more non-contact input sensors of the same type or two or more non-contact input sensors of different types.

For example, one measuring device may be provided with two or more photosensors. A photo sensor with the same function may be provided as a spare so that if one photo sensor fails, the input detection function can be maintained by the other photodetector.

Alternatively, the first photosensor, the second photosensor, and the third photosensor, and so on may be responsible for different input detection.

The first photosensor may be used to detect a base-point setting instruction (measurement start instruction), the second photo sensor may be used to input a base-point resetting time, and the third, fourth photosensors, and so on may be used to switch modes (maximum-value hold display, minimum-value hold display, intermediate-value hold display, and the like).

One measuring device may be provided with one or more photosensors and two or more human detecting sensors.

One measuring device may be provided with one or more photosensors and two or more non-contact touch panels.

One measuring device may be provided with one or more photosensors, one or more human detecting sensors, and one or more non-contact touch panels.

All input devices of the measuring device may be non-contact input sensors. In this case, the user does not need to directly touch the measuring device. However, if all operations are to be per formed by non-contact input sensors, such a large number, size, and sensitivity of non-contact input sensors (photosensors, human detecting sensors, non-contact touch panels) are required and all display control and input/output control need to be redesigned, which can considerably increase component and design costs. In addition, it may be difficult for both users and designers to perform somewhat complicated setting input operations using only non-contact input sensors (photosensors, human detecting sensors, and non-contact touch panels). Therefore, it is desirable to use both conventional pushbuttons and non-contact input sensors. Pushbuttons can be used to perform somewhat complicated settings in a preparation stage before measurement, and users are accustomed to using them. On the other hand, if it is desirable not to touch the measuring device directly, such as a base-point setting instruction (measurement start instruction) or a mode switching instruction during measurement, and if instructions are simple, it is reasonable to give instructions through non-contact input sensors. In this manner, it is desirable to have both conventional pushbuttons and non-contact input sensors and to use them for different functions.

100 Indicator
110 Measuring device main body
120 Spindle
130 Display part
140 Button
150 Electric circuit unit
151 Encoder
160 Central control unit
170 Timer
180 Memory unit
210 Photosensor
220 Human detecting sensor
240 Non-contact touch panel
10 Stand
W Workpiece
20 Lathe

The invention claimed is:

1. A small-sized measuring device comprising:
a main body;
a position detector provided on the main body and configured to detect a position of an object to be measured by contact or non-contact;
a timer configured to measure time; and
a central control unit configured to control overall operation, wherein
the central control unit is configured:
to accept a base-point setting standby time set by a user and store the base-point setting standby time;
to measure elapse of the base-point setting standby time after accepting an instruction to start measuring time from the user;
to perform a base-point setting step of setting the position of the object to be measured detected by the position detector as a base point after the base-point setting standby time has elapsed; and
to perform a measurement step of measuring the position of the object to be measured as a relative position from the base point.

2. The small-sized measuring device according to claim 1, wherein the central control unit is configured to repeat the base-point setting step at intervals of the base-point setting standby time while performing the measurement step.

3. The small-sized measuring device according to claim 1, wherein
the central control unit is further configured:
to accept a base-point resetting standby time set by the user and store the base-point resetting standby time; and
to repeat the base-point setting step at intervals of the base-point resetting standby time while performing the measurement step.

4. The small-sized measuring device according to claim 1, wherein the position detector is a detector having a single measurement axis.

5. The small-sized measuring device according to claim 1, wherein
the position detector includes:
a movable member provided on the main body to be movable forward and backward and to be brought into contact with the object to be measured; and
an encoder configured to detect a position of the movable member.

6. The small-sized measuring device according to claim 1, wherein
the small-sized measuring device is a portable small-sized measuring device to be carried in a hand of the user and to be attached to a stand to maintain a relative posture or a relative position with respect to the object to be measured.

7. The small-sized measuring device according to claim 1, wherein the main body is provided with an input device with which the user gives the instruction to start measuring time.

8. An operating method of the small-sized measuring device according to claim 1, the method comprising:
completing by a user, after an instruction to start measuring time, adjustment of a relative position or a relative posture between an object to be measured and the small-sized measuring device before the base-point setting standby time elapses.

* * * * *